(12) United States Patent
Sprague et al.

(10) Patent No.: US 9,319,419 B2
(45) Date of Patent: Apr. 19, 2016

(54) DEVICE IDENTIFICATION SCORING

(71) Applicant: Wave Systems Corp., Lee, MA (US)

(72) Inventors: Michael Sprague, Lee, MA (US);
Steven Sprague, Lee, MA (US); Robert Thibadeau, Lee, MA (US)

(73) Assignee: Wave Systems Corp., Lee, MA (US)

( * ) Notice: Subject to any disclaimer, the term of this patent is extended or adjusted under 35 U.S.C. 154(b) by 155 days.

(21) Appl. No.: 14/066,870

(22) Filed: Oct. 30, 2013

(65) Prior Publication Data
US 2015/0089568 A1    Mar. 26, 2015

Related U.S. Application Data

(60) Provisional application No. 61/882,884, filed on Sep. 26, 2013.

(51) Int. Cl.
*H04L 29/06*    (2006.01)

(52) U.S. Cl.
CPC .......... *H04L 63/126* (2013.01); *H04L 63/0876* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 5,903,721 | A * | 5/1999 | Sixtus | 726/2 |
| 6,510,236 | B1 * | 1/2003 | Crane et al. | 382/116 |
| 6,892,179 | B1 * | 5/2005 | Zacharia | 705/4 |
| 7,086,085 | B1 | 8/2006 | Brown et al. | |
| 7,213,260 | B2 * | 5/2007 | Judge | 726/3 |
| 7,299,493 | B1 * | 11/2007 | Burch et al. | 726/5 |
| 7,617,542 | B2 * | 11/2009 | Vataja | 726/30 |
| 7,818,343 | B1 * | 10/2010 | Sekhar et al. | 707/781 |
| 7,937,480 | B2 * | 5/2011 | Alperovitch et al. | 709/229 |
| 7,949,716 | B2 * | 5/2011 | Alperovitch et al. | 709/206 |
| 8,001,582 | B2 * | 8/2011 | Hulten et al. | 726/3 |
| 8,185,930 | B2 * | 5/2012 | Alperovitch et al. | 726/1 |
| 8,321,913 | B2 * | 11/2012 | Turnbull et al. | 726/4 |
| 8,327,131 | B1 * | 12/2012 | Hardjono et al. | 713/156 |

(Continued)

FOREIGN PATENT DOCUMENTS

WO    WO 2015/047992 A2    4/2015

OTHER PUBLICATIONS

Kesici ("Evaluation of Multifactor Authentication using Mobile Phones", Ecole Polytechnique Federale De Lausanne, Mar. 2012).*

(Continued)

*Primary Examiner* — Peter Poltorak
(74) *Attorney, Agent, or Firm* — Hamilton, Brook, Smith & Reynolds, P.C.

(57) ABSTRACT

Device identification scoring systems and methods may be provided that can increase the reliability and security of communications between devices and service providers. Users may select and configure additional identification factors that are unique and convenient for them. These factors, along with additional environmental variables, feed into a trust score computation that weights the trustworthiness of the device context requesting communication with a service provider. Service providers rely on the trust score rather than enforce a specific identification routine themselves. A combination of identification factors selected by the user can be aggregated together to produce a trust score high enough to gain access to a given online service provider. A threshold of identification risk may be required to access a service or account provided by the online service provider.

32 Claims, 11 Drawing Sheets

(56) References Cited

U.S. PATENT DOCUMENTS

| | | | |
|---|---|---|---|
| 8,538,065 B2* | 9/2013 | Bladel et al. | 382/100 |
| 8,726,344 B1* | 5/2014 | Amidon et al. | 726/2 |
| 2001/0056409 A1* | 12/2001 | Bellovin et al. | 705/64 |
| 2002/0123921 A1* | 9/2002 | Frazier | 705/9 |
| 2003/0110381 A1* | 6/2003 | Aoshima et al. | 713/168 |
| 2003/0212806 A1* | 11/2003 | Mowers et al. | 709/229 |
| 2003/0216143 A1* | 11/2003 | Roese et al. | 455/456.1 |
| 2003/0217288 A1* | 11/2003 | Guo et al. | 713/201 |
| 2004/0003283 A1* | 1/2004 | Goodman et al. | 713/201 |
| 2005/0055578 A1* | 3/2005 | Wright et al. | 713/201 |
| 2005/0076198 A1* | 4/2005 | Skomra et al. | 713/156 |
| 2005/0097320 A1* | 5/2005 | Golan et al. | 713/166 |
| 2005/0159998 A1* | 7/2005 | Buyukkokten et al. | 705/11 |
| 2005/0160298 A1 | 7/2005 | Reno | |
| 2005/0166053 A1* | 7/2005 | Cui | H04L 9/3239 713/176 |
| 2005/0251573 A1* | 11/2005 | Merkow et al. | 709/226 |
| 2006/0053296 A1* | 3/2006 | Busboom et al. | 713/182 |
| 2006/0123465 A1* | 6/2006 | Ziegler | 726/2 |
| 2006/0212931 A1* | 9/2006 | Shull et al. | 726/10 |
| 2006/0224742 A1* | 10/2006 | Shahbazi | 709/226 |
| 2007/0101438 A1* | 5/2007 | Govindarajan | 726/27 |
| 2007/0130349 A1* | 6/2007 | Wong | 709/229 |
| 2007/0130350 A1* | 6/2007 | Alperovitch et al. | 709/229 |
| 2007/0203850 A1 | 8/2007 | Singh et al. | |
| 2007/0250459 A1* | 10/2007 | Schwarz et al. | 705/500 |
| 2008/0059804 A1* | 3/2008 | Shah et al. | 713/186 |
| 2008/0120711 A1 | 5/2008 | Dispensa | |
| 2008/0141366 A1* | 6/2008 | Cross et al. | 726/21 |
| 2009/0158392 A1* | 6/2009 | Hughes | H04L 63/08 726/3 |
| 2009/0165111 A1* | 6/2009 | Zhang et al. | 726/9 |
| 2009/0300720 A1* | 12/2009 | Guo | G06Q 10/107 726/3 |
| 2010/0293094 A1* | 11/2010 | Kolkowitz et al. | 705/44 |
| 2010/0325040 A1 | 12/2010 | Etchegoyen | |
| 2011/0137789 A1* | 6/2011 | Kortina | G06Q 20/405 705/38 |
| 2011/0179477 A1* | 7/2011 | Starnes | G06F 21/52 726/9 |
| 2011/0213959 A1* | 9/2011 | Bodi et al. | 713/155 |
| 2011/0271329 A1* | 11/2011 | Hulten et al. | 726/4 |
| 2012/0114191 A1* | 5/2012 | Bladel et al. | 382/115 |
| 2012/0233665 A1* | 9/2012 | Ranganathan et al. | 726/4 |
| 2012/0317217 A1* | 12/2012 | Lavy | G06Q 10/10 709/206 |
| 2013/0007868 A1* | 1/2013 | Hoggan et al. | 726/8 |
| 2013/0212654 A1* | 8/2013 | Dorfman et al. | 726/5 |
| 2013/0227651 A1* | 8/2013 | Schultz et al. | 726/4 |
| 2013/0254880 A1* | 9/2013 | Alperovitch et al. | 726/22 |
| 2013/0298192 A1* | 11/2013 | Kumar | G06F 21/52 726/3 |
| 2013/0305378 A1* | 11/2013 | Johnson | G06Q 20/02 726/26 |
| 2013/0311771 A1* | 11/2013 | Hoggan | 713/156 |
| 2014/0089526 A1* | 3/2014 | Schmidt | 709/249 |
| 2014/0090033 A1* | 3/2014 | Lerner | H04L 63/107 726/5 |
| 2014/0230032 A1* | 8/2014 | Duncan | 726/7 |
| 2014/0259116 A1* | 9/2014 | Birk et al. | 726/4 |
| 2015/0089568 A1* | 3/2015 | Sprague | H04L 63/0876 726/1 |

OTHER PUBLICATIONS

Wave2 (Developing a Framework to Improve Critical Infrastructure Cybersecurity, Wave Systems Corp, Mar. 2013).*

Wave ("Trusted Computing. An Already Deployed, Cost Effective, ISO Standard, Highly Secure Solution for Improving Cybersecurity", Wave System Corp, Deparment of Commerce Internet Policy Task Force Notice of Inquiry, Sction 4. Authentication/Identity (ID) Management, Jul. 2010.*

Hewlett-Packard (Congdon et al., "Tursted Computing Overview", Hewlett-Packard Development Company, 2004).*

Scarfone (Scarfone et al., Guide to Enterprise Telework and Remote Access Security, NIST Special Publication 800-46, Rev. 1, Jun. 2009.*

International Search Report and Written Opinion for Int'l Application No. PCT/US2014/056926, Titled: Device Identification Scoring, Date of Mailing: Mar. 26, 2015.

* cited by examiner

```
1  function calculateTrustScore() {
2    var totalAvailable = 0;
3    var totalRepresented = 0;
4    for (var i=0;i<application.length;i++) {
5      totalAvailable += application[i].weight;
6    }
7    $("#deviceStateTable select").each(function() {
8      totalRepresented += parseFloat($(this).val()); // this is the applied value weighting times the selected factor weighting
9    });
10   var trustScore = parseInt((totalRepresented/totalAvailable)*800);
11   trustScore += 200;
12   $("#trustScoreValue").text(trustScore);
13 }
```

FIG. 4B

DEVICE IDENTIFICATION SCORING

RELATED APPLICATION(S)

This application claims the benefit of U.S. Provisional Application No. 61/882,884, filed on Sep. 26, 2013. The entire teachings of the above application are incorporated herein by reference.

BACKGROUND

There are several different methods for authenticating a user context to an online service. Traditionally, online service providers have typically relied on username and passwords for online authentication. Considering, however, the sensitive and personal information that people share on the Web, relying on a single layer of password protection is not enough.

Multi-factor authentication is an approach that has recently become more widespread for use in online authentication systems in order to increase the probability that a user requesting access to an online service is presenting accurate identity authentication information. Multi-factor online authentication typically requires a user to enter a username and password, as well as pass an additional identification test specified by the online service provider.

The authentication factors generally fall within three categories: something you know, something you have, or something you are. Typically a password is given as something you know. Each authentication factor may be required to authenticate or verify a person's identity before, for example, granting access, approving a transaction request, signing a document or other work product, granting authority to others, or establishing a chain of authority.

One of three general authentication categories (approaches) may include ownership factors, e.g. something the user has (e.g., wrist band, ID card, security token, software token, phone, or cell phone). Another authentication category may include knowledge factors, which may be something the user knows (e.g., a password, pass phrase, or personal identification number (PIN), challenge response (the user must correctly answer a question)). Another authentication category may include inherence factors, which may be something the user is or does (e.g., fingerprint, retinal pattern, DNA sequence, signature, face, voice, unique bio-electric signals, or other biometric identifier).

There has been a recent trend in online authentication to rely on SMS as a second factor to username and password for online authentication. While online banks have been using SMS-enhanced authentication for transaction verification for sometime, more recently online businesses, which are not in regulated banking industries, have recognized the need for stronger online authentication protocols and have been employing SMS as a second factor for authentication. Google and Facebook, for example, have recently made two-factor SMS authentication available to their users.

Another authentication approach is for a service provider to equip the user with a One Time Password (OTP) device. The device generates a string of numbers that change regularly and, when combined with the user's username and password, can be used to more securely identify the individual requesting access to the service provider.

Another authentication approach uses a picture the user has selected. The user points to a sequence of locations on the picture which only he or she knows. This pattern cannot be as easily written down, and yet can be more memorable than a password, thus making it potentially more reliable and user friendly than passwords.

SUMMARY

While reliable methods for online authentication exist, problems remain. Online authentication using multi-factor identification, such as SMS confirmation, biometric fingerprints, or one-time-passwords, may be reliable, but typically lack flexibility and can present an inconvenience to both the third party online service provider implementing the authentication process and to the user requesting access to the third party online service provider's services.

The type of factors required are often implemented and imposed by the third party online service provider. Implementation of the multi-factor authentication protocols can burden the service provider by, for example, imposing business process reengineering of its systems, while requiring maintenance to continuously ensure secure implementation. For example, if SMS is shown someday to be unsatisfactory or becomes unavailable, all service providers who implement SMS second factor will need to work on an alternate implementation. Further, multi-factor authentication protocols can burden users requesting access by forcing the users to comply with potentially rigid authentication requirements imposed by the third party service provider.

For example, if a third party online service provider configures its second factor authentication to require SMS challenges, this can burden a user requesting access since the user requester has to have his or her associated smart phone or have access to their VOIP account in order to satisfy the authentication process. Further, even if the user requesting access conveniently has, for example, their respective smart phone or VOIP service executing, the authentication process takes time since the requester has to view and input the SMS password received.

Further, second factor authentication often relies on some type of knowledge factor, which may include a knowledge based challenge, password, or something the user knows. Such knowledge factors can burden the user since this relies on the accuracy of the requester's memory or ability to find information to help them remember. In addition, knowledge factors have shown to be particular vulnerable as security requires complexity and complexity is hard to remember. The more complex a knowledge factor is, the more likely it is to be written down and exposed.

In today's dynamic global environment, striking the balance between information security and ease of use in an online authentication protocols can mean the difference between success and failure for a new product or even a new company. While users want a secure online authentication, they also want a versatile and convenient authentication process that, preferably, requires little to no information from them to satisfy. Although there are online authentication systems that are secure, such systems are able to provide this increased security by imposing burdens on the user requesting access and the third party online service provider implementing the authentication system. Thus, users are at the mercy of the service provider's selected online authentication system, and the service providers are forced to implement and maintain the system. As such, the current online authentication schemes are unable to effectively balance strong security with usability and avoidance of substantial business process and system reengineering.

Moreover, the currently available online authentication models typically place too much emphasis on user identification and verification. At the center of nearly all identification events to online service providers is the request for a username. The assumption is that the user is always employing different devices to access his or her services when in fact the market has evolved away from one of dumb terminals to the use of smart and very personal devices. Because a user is likely to regularly use the same device or devices to access a service the identity of an account can usually be derived. This is often done today with browser cookies. With cookies, users may enjoy the convenience of not typing a username particularly when an online session is remembered for a given device and user authentication may therefore not be required. Cookies, however, are very easily compromised and, consequently, service providers should not rely on them alone.

Some example embodiments of the present invention can alleviate the burdens imposed by conventional user authentication and cryptology systems by relying on differential device identification and external contextual tests to perform identification. With the inventive system, the user is inconvenienced with as little interaction as possible, or only in the ways he or she selects, and the service provider receives a degree of confidence that enables them to provide a valuable service to the user free of hassle.

One example preferred embodiment of the present invention makes use of a hardware root of trust in a device as a first factor of identification, while also including increased flexibility by recognizing that devices have different features and contexts. Systems and methods can therefore be provided that employ many diverse identification factors, some configurable by the user, that are rolled up into a trust score that provides a measure of confidence about the identity of the device.

User identification systems and methods may be provided that may reduce the vulnerability and use of passwords, while providing diverse identification processes with improved usability and reduced business process reengineering requirements. Instead of the third party online service provider implementing and imposing online identification factors, the present system may provide online device identification services, which allow users to control their respective identification processes for a multitude of third party online service providers. In this way, the user may only need to configure identification factors once. The present device identity system may provide a diverse range of device identification options and additional context verification to be leveraged at the choice of the user(s) and/or service provider(s) using an independent site, such as a device identity server. In this way, the rigid requirements typically imposed for user identification in conventional systems can be replaced or augmented with a device identity system that provides differential identity tests, which consider external contextual tests, which may be defined, managed, and controlled by the user instead of the third party service providers in some embodiments (or by the third party service provider or by both in other respective embodiments).

In some embodiments, a user may select a combination of external contextual factors, which can be aggregated together, to produce a trust score high enough to confidently identify a device and thereby allow the device access to a given third party online service provider.

In further embodiments, a third party service provider may select a combination of external contextual factors, which can be aggregated together, to produce a trust score high enough to confidently identify a user's device and thereby allow the device access to its respective third party service(s).

The user and/or third party service provider may define the thresholds of identification risk it requires by configuring respective trust score thresholds for access to different levels of the third party service provider's service(s).

For every user device context, such as a PC, an ID may be assigned and assigned a trust score computation for the reliability of that device ID. For example, if the device ID is only a cookie, a low trust score may be assigned since cookies tend to be vulnerable to tampering. If, however, the device ID is a key held in device hardware paired with a cookie, a much higher score may be assigned. The system may default to always attempting to discover a previously assigned ID. The system may endeavor to automatically validate a device ID through more than one factor, when possible. Multiple factors (context verification factors) previously chosen and defined by the user when registering their device(s) for use when computing a trust score.

Example context verification-factors/tests that may executed during a device identification process may include:

- a trusted ID assigned to each of the user's trusted devices (e.g. if a device being identified has an ID that matches an ID of a trusted device previously specified by the user, the device can be associated with a high confidence of trust, which would increase the resulting confidence value of this factor in the computation of the trust score for an active device identification session);
- trusted physical geographic locations (e.g. a user may specify physical geographic locations from which a trusted device is likely to login, or the device identity server can recall trusted geographic locations, which if satisfied in a device identification session, can increase the confidence value of this factor in the computation of the trust score for a device identification session);
- a phone number to confirm an SMS passcode (e.g. a ping to SMS or IVR, which may include a passcode received in an SMS message, or a call to a smartphone or IVR requesting input of certain keys or information;
- a camera on the device to register facial recognition or audio input to satisfy voice recognition, (e.g. if a face detection or voice detection match is determined, this can result in an increased confidence value of this factor in the computation of the trust score for a device identification session);
- first and/or second passwords (e.g. if password match is determined, this can result in an increased confidence value of this factor in the computation of the trust score for an active device identification session);
- wearable computing, such as Google glass (e.g. if a particular tap on the glasses matches a defined tap, which if satisfied, can result in an increased confidence value of this factor in the computation of the trust score for an active device identification session);
- HID Global Access Control (e.g. a user may pair its trusted devices with other systems, such as a HID access control or alarm system, which if satisfied can result in an increased confidence value of this factor in the computation of the trust score for an active device identification session);
- databases or contexts (e.g. compare the context of the device that is attempting to login against other access systems, for example, if a user associated with the device recently walked into a building using an associated key card, and a device associated with that user is attempting to gain access to the network, then this can result in an increased confidence value of this factor in the computation of the trust score for an active device identification session);
- QR Code—bar code (a two dimensional barcode datamatrix, which may be detected and captured by a camera using decoding software, which if satisfied can result in an increased confidence value of this factor in the computation of the trust score for an active device identification session);

URL code embedded in an email message (if the URL is embedded in a message and selected, this can result in an increased confidence value of this factor in the computation of the trust score for an active device identification session);

a hand gesture detected by a camera on the device being identified, which if satisfied can increase the confidence value of this factor in the computation of the trust score for an active device identification session;

a knowledge-based identification challenge (e.g. picture password challenge is satisfied, this can result in an increase in the confidence value of this factor in the computation of the trust score for an active device identification session); and web history (e.g. if predefined URLS or domains, which the user frequently visits, are found in recent website history that are substantially contemporaneous to an active device identification session, this can result in an increase in the confidence value of this factor in the computation of the trust score for the subject active device identification session).

It should be noted that the above referenced examples used in context verification tests are exemplary and not exhaustive. External context verification tests/factors not listed above, which are well known by one of ordinary skill in trusted computing, may be used as well.

Some example preferred embodiments may allow a user to configure their identity verification mechanisms such that multiple trusted devices need to be paired with the device from which the user is logging-in. The presentation of paired devices during an identification event can provide increased confidence and may satisfy the trust identification threshold for full access to the third party online service, account, device, etc. In this way, a trust score threshold may be satisfied without requiring knowledge factors for identification. By relying on paired devices to calculate the trust score, the present embodiment can improve usability and convenience for the user during online identification without burdening the user for input. In this way, multi-factor device identification can be provided without relying on user passwords, or other forms of knowledge factors, thus provide substantially immediate device identification for the third party online service being sought. Such immediate device identification can, for example, facilitate identity verification for an account or a credit card and can shorten the amount of time to complete a potential sale and thereby help increase the overall chances of completion of the purchase.

Some embodiments may provide a trusted platform configuration that allows tiered levels of access based on the trust score determined during the device identification process. A user, for example, can configure their device identity verification settings such that certain trust score thresholds, if satisfied during an online session, grant different levels of access. For example, if the trusted platform system determines that a device's trust score is 300 (instead of a 900), then limited access to sensitive information associated with the third party online service provider may be granted; whereas a trust score threshold of 900 may be required by the user for full access to sensitive information.

A third party online service provider using this system to identify a user context can be configured to request or ask for the id. This process may be transparent to the user or may require some user interaction, such as confirming an SMS, entering a PIN or swiping a finger. The third party online service provider may only look at the trust score provided with the returned device identifier to determine whether it can be trusted as sufficient for a particular level of service.

A highly trusted identifier could be used in place of username and password. It could also be configured to protect particularly sensitive transactions, such as a money transfer. However, the third party online service provider can be configured such that it is not concerned with the broad array of strong identification methods. A picture password plus a software key could result in a similar trust score to a certified hardware key.

When an id and trust score is returned, the system can also indicate whether it believes there may be options to improve the trust score through some action such as downloading software or pairing another device.

Some embodiments may include data processing systems and methods configured to facilitate identification of a first device seeking to communicate with one or more third party online service providers. A session handler may be configured to communicate with the first device to determine at least one unique identifier assigned to the device. The session handler may be configured to request additional context verification from one or more of: the first device, an operator of the first device, or one or more other devices.

A trust scoring engine may be in communication with the session handler. The trust scoring engine may be implemented as part of a device identify agent executing on the first device. Portions of the identity agent may be executing from the first device, and other portions may be executing from the identity server. The trust scoring engine may be configured to compute a trust score based on (i) the trustworthiness of the first device unique identifier, and (ii) results from the additional context verification.

A communication interface may be provided in which the third party service provider can receive the first device unique identifier and the computed trust score of the first device. The third party service provider may respond to the receipt of the first device unique identifier and the computed trust score by determining if the unique identifier is associated with a trusted device, and if the trust threshold is satisfied. If it is not satisfied, the trust scoring engine may be configured to execute additional context verification tests until the threshold is satisfied or the session has ended.

Some embodiments may include data processing systems and methods that include a device identity service configured to facilitate configuration of a device identity verification process. The device identity server may be configured to compute a trust score for a first device in response to a request from a third party service provider. The device identity service may be configured to execute, on one or more computer processors, a device identity verification process responsive to the third party service provider request.

The device identity process being configured to:
  determine a plurality of unique identifiers associated with the first device, the plurality of unique identifiers being configured for use in the computation process of the trust score for the first device;
  send the computed trust score and a pseudonymous id representing the first device to the third party service provider at which a determination is made as to whether the first trust score computation satisfies a trust score threshold; and
  respond to an indication from the third party service provider that the trust score threshold has not been satisfied by executing a multitude of additional verification tests and, iteratively computing respective iterations of a further trust score for the first device based on the satisfaction of the additional verification tests, where each computed of a further computed trust score is passed to the third party service provider for determination as to whether it satisfies the trust score threshold;

the additional verification tests being based on data obtained from the first device, an operator of the first device, or one or more other devices.

Systems, methods and computer program products may be provided to enable a third party to request the component factors that went into calculating a trust score for a subject device. For example, in addition to the trust score, the third party may further request from the system component factors, such as the length of time this device has been known, or whether a hardware or software key was used. The type of identification key used, whether hardware or software, may be indicative its reliability. The third party may use this information to make additional risk assessments of its own when identifying the trustworthiness of the purported identity of the device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 4B is example software code for a trust score calculation function.

DETAILED DESCRIPTION OF THE INVENTION

A description of example embodiments of the invention follows.

The web provides an enormous resource of services that are increasingly interwoven with social and professional lives of its users. There is, however, a gulf in the bilateral trust between user and service. A user is typically wary about whether the online service is in fact what it professes to be, and the online service typically needs to be diligent when verifying that the user is in fact the true account holder. Further, users are expected to remember passwords for all of their respective online services, e.g. banking, financial services, shopping, social media, email, etc. In an attempt to provide some degree of account security, users manage such an army of passwords that they often need to rotate and reset, as well as remember and unfortunately, sometimes forget.

Today, more and more devices interface with the web, from smartphones to computers and televisions. With the present invention, such devices can provide an anchor-like attribute of trust between the user and the account holder. The user, for example, logs into the device and the device logs into the web. Users' confidence in the web will grow when they can ensure that only trusted devices can access their online services.

Certain embodiments of the present disclosure provide the tools for managing trust in the cloud. Aspects of the present disclosure relate to device identification systems and processes that may reduce the vulnerability and use of passwords, while providing diverse/differential and flexible identification processes. FIGS. 1A-1D show examples in which some embodiments of the device identification system 100 may (FIG. 1D) deployed.

Digital Processing Environment

Figure 1A:
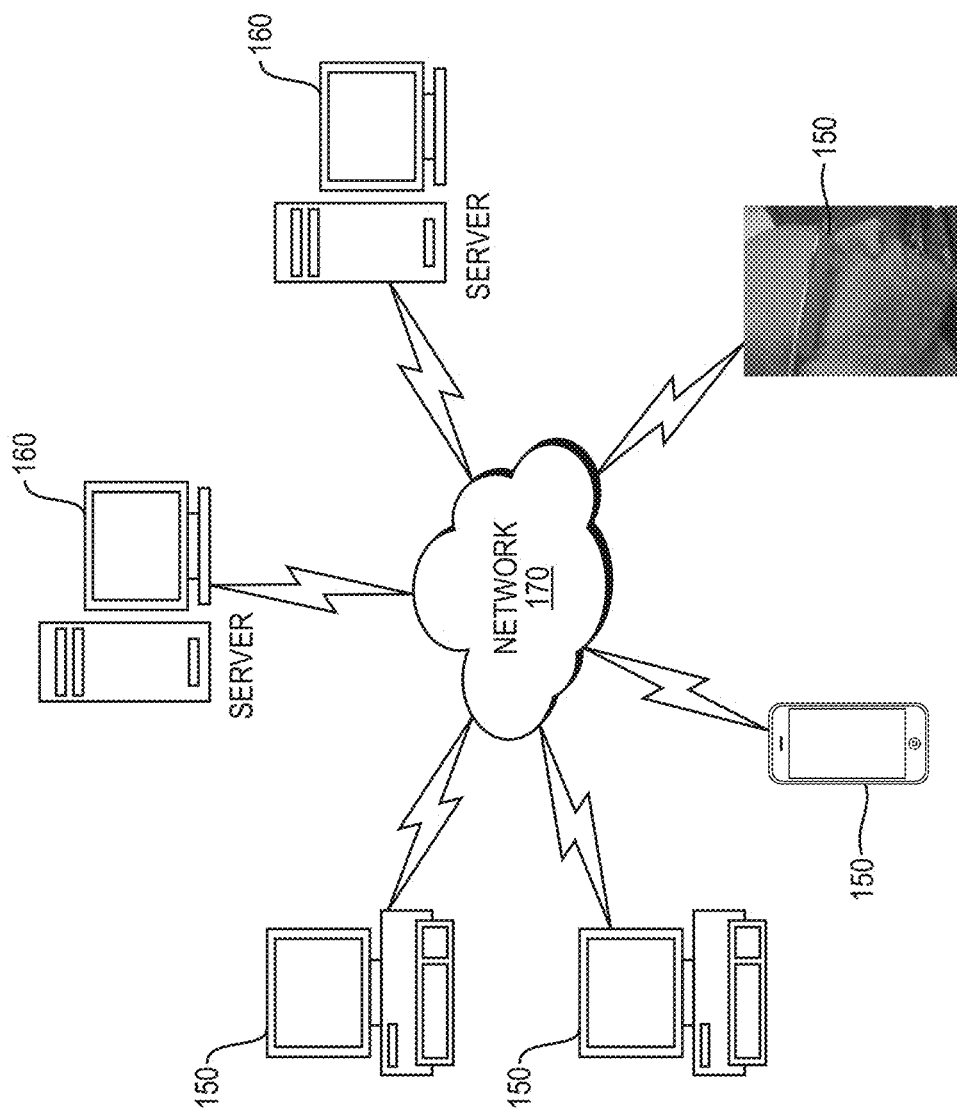
FIG. 1A is a schematic diagram of an example computer network environment in which embodiments are deployed.

Example implementations of a device identification system 100 may be implemented in a software, firmware, or hardware environment. FIG. 1A illustrates one such environment. Client computer(s)/devices 150 (e.g. computer, mobile phone, and video camera) and a cloud 170 (or server computer or cluster thereof) provide processing, storage, and input/output devices executing application programs and the like.

Client computer(s)/devices 150 are linked through communications network 170 to other computing devices, including other client devices/processes 150 and server computer(s) 160. The cloud 170 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Server computers 160 may be configured to provide a device identification system 100 that allows a user/third party service provider to specify context identification factors for use in a trust score calculation process that provides a measure of confidence of an identity of a device 150 from which the end user may be operating.

In one example embodiment, one or more of the servers 160 are Java application servers. The Java application servers are scalable, such that if there are spikes in network traffic, the servers can handle the increased load.

Figure 1B:
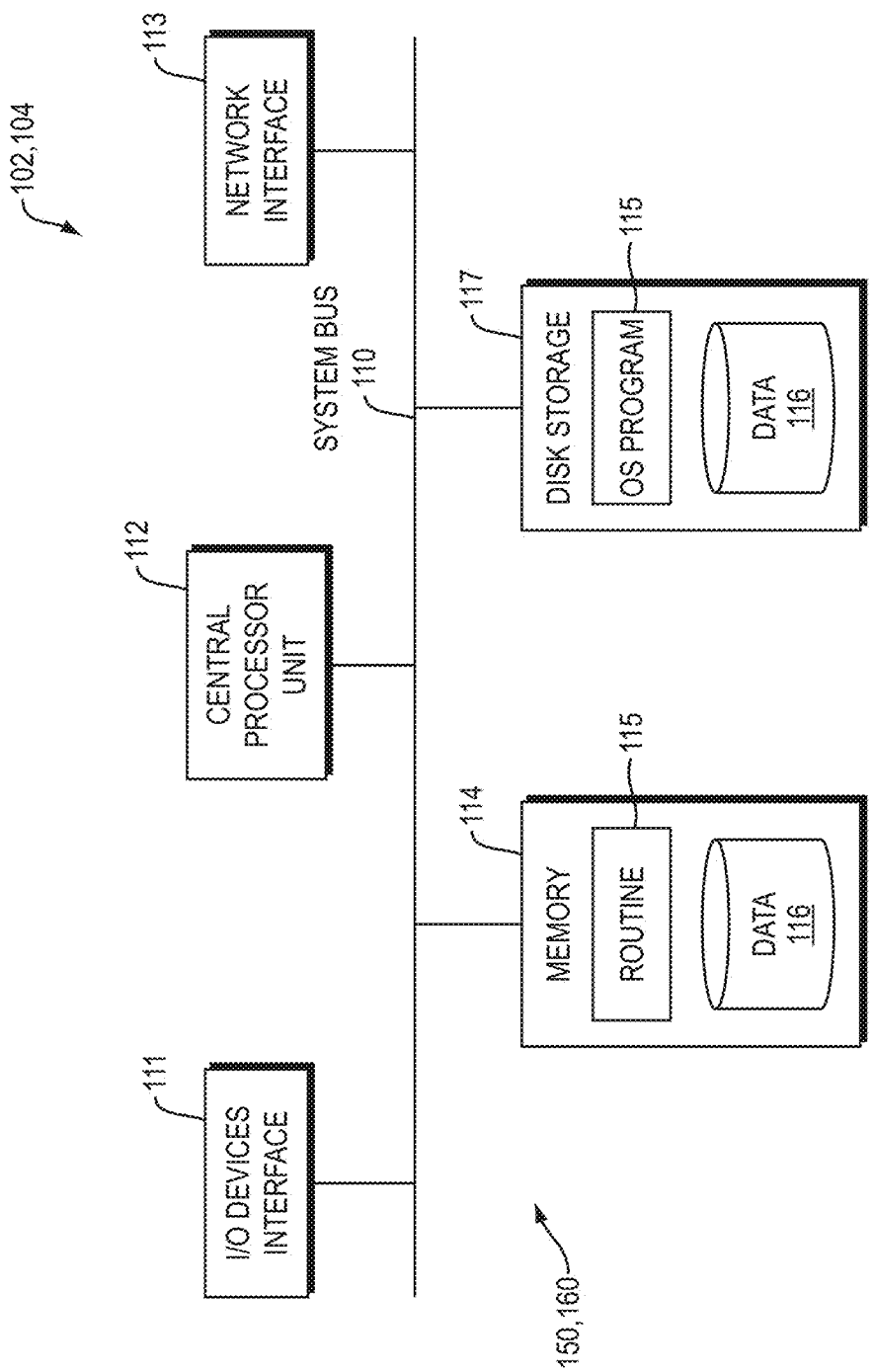
FIG. 1B is a block diagram of certain components of the computer nodes in the network of FIG. 1A.

FIG. 1B is a block diagram of any internal structure of a computer/computing node (e.g., client processor/device/mobile phone device/tablet/video camera 150 or server computers 160) in the processing environment of FIG. 1A, which may be used to facilitate displaying audio, image, video or data signal information. Embodiments of the invention may include means for displaying audio, image, video or data signal information. Each computer 150, 160 in FIG. 1B contains a system bus 110, where a bus is a set of actual or virtual hardware lines used for data transfer among the components of a computer or processing system. Bus 110 is essentially a shared conduit that connects different elements of a computer system (e.g., processor, disk storage, memory, input/output ports, etc.) that enables the transfer of data between the elements.

Attached to system bus 110 is I/O device interface 111 for connecting various input and output devices (e.g., keyboard, mouse, touch screen interface, displays, printers, speakers, audio inputs and outputs, video inputs and outputs, microphone jacks, etc.) to the computer 150, 160. Network interface 113 allows the computer to connect to various other devices attached to a network (for example the network illustrated at 170 of FIG. 1A). Memory 114 provides volatile storage for computer software instructions 115 and data 116 used to implement software implementations of components of the present inventions (e.g. device identification system 100 of FIG. 1D).

Figure 3:
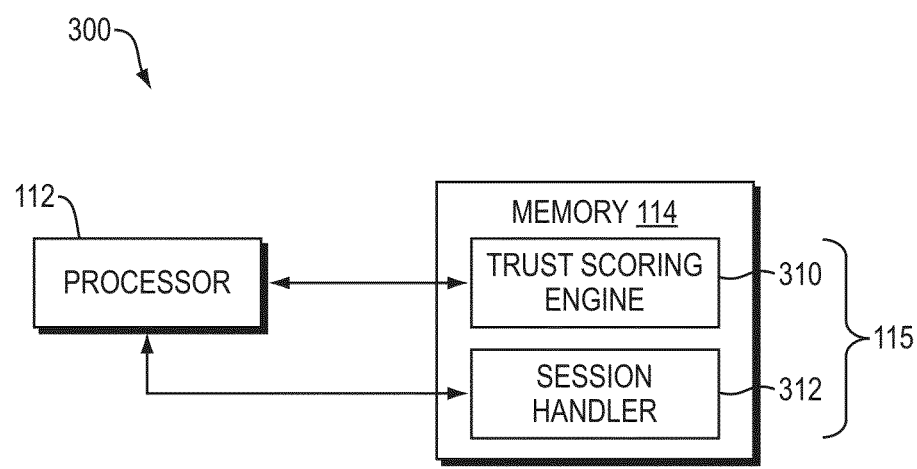
FIG. 3 is a block diagram of certain components of the computer nodes in the network of FIG. 1A.

Software components 114, 115 of the device identification system 100 (FIGS. 1B and 4) described herein may be configured using any known programming language, including any high-level, object-oriented programming language. The system 100 may include instances of processes, which allow third party service providers/users to configure additional context verification factors for a device. The identity server may include instances of a trust scoring engine 310 (FIG. 3), which can be implemented as a client that communicates to the server 160 through SSL and computes a trust score that provides a measure of confidence about the identity of a computing device 150 based on, for example, information about the device (e.g. device IDs, trusted platform module, etc.) and the additional device identity context verification settings. In some embodiments, the computing device 150 identification may be implemented via a software embodiment and may operate, at least partially, within a browser session.

In an example mobile implementation, a mobile agent implementation of the invention may be provided. A client server environment can be used to enable mobile security services using the device identity server 190. It can use, for example, the XMPP protocol to tether a device identification agent 115 on the device 150 to a server 160. The server 160 can then issue commands to the phone on request. The mobile user interface framework to access certain components of the system 100 may be based on XHP, Javelin and WURFL. In another example mobile implementation for OS X and iOS operating systems and their respective APIs, Cocoa and Cocoa Touch may be used to implement the client side components 115 using Objective-C or any other high-level programming language that adds Smalltalk-style messaging to the C programming language.

Disk storage 117 provides non-volatile storage for computer software instructions 115 (equivalently "OS program") and data 116 used to implement embodiments of the system 100. Central processor unit 112 is also attached to system bus 110 and provides for the execution of computer instructions.

In one embodiment, the processor routines 115 and data 116 are computer program products, e.g. session handler 312 and trust scoring engine 310 (generally referenced 115), including a computer readable medium capable of being stored on a storage device 117, which provides at least a portion of the software instructions for the device identification system 100. Executing instances of respective software components of the device identification system 100, such as instances of trust scoring engine may be implemented as computer program products 115, and can be installed by any suitable software installation procedure, as is well known in the art. In another embodiment, at least a portion of the system software instructions 115 may also be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present device identification system 100 of FIG. 1D.

Device (Endpoint) Identities

Figure 1C:
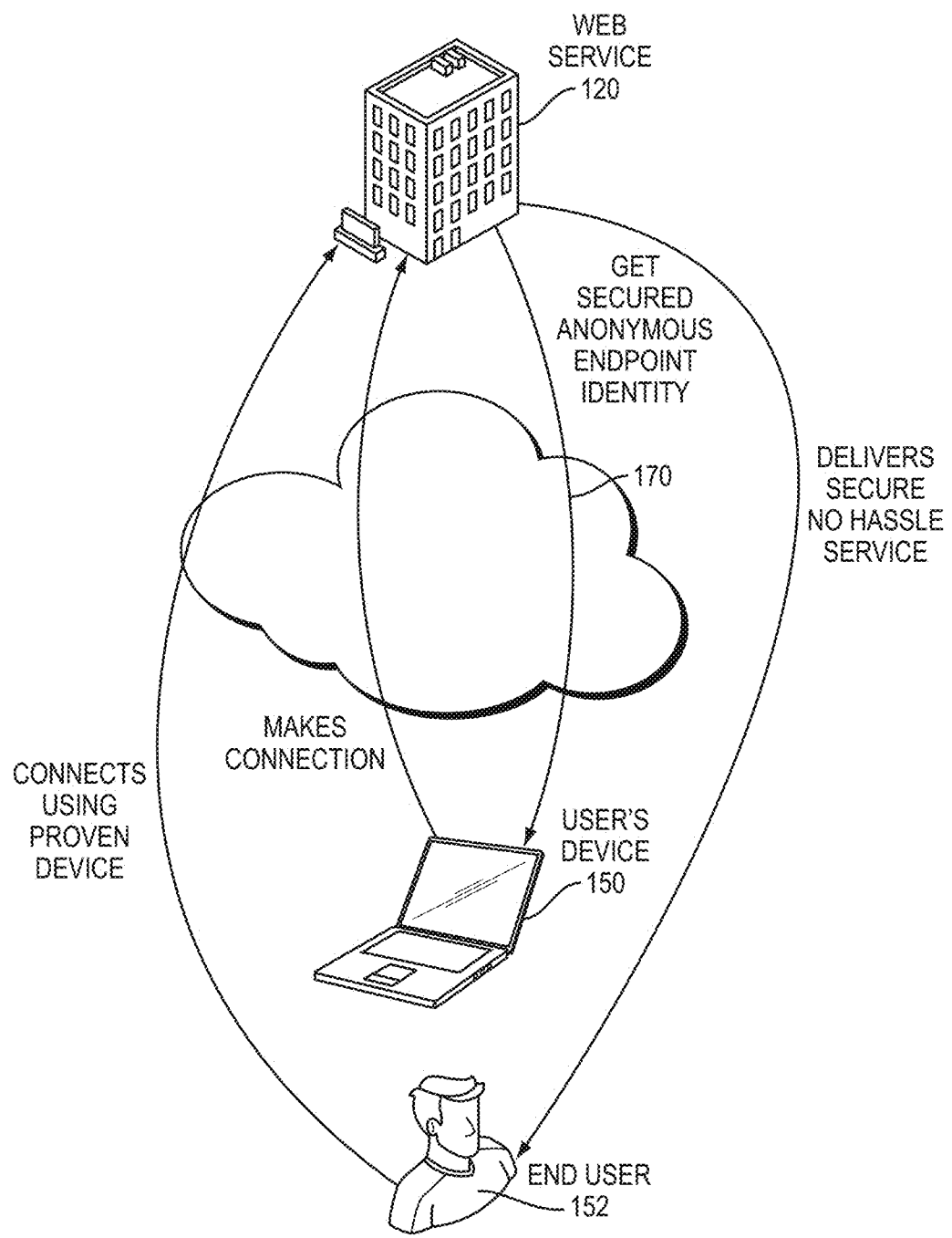
FIG. 1C is a schematic diagram of a device identification process according to an embodiment of the present invention.

An endpoint 120 of FIG. 1C provides the link between a unique device identity and Internet services, such email, banking, shopping, etc. The device identification system 100 leverages technology in endpoint security to deliver this differential identity service to its users. Using embodiments of the device identification system, users 152 can have confidence that only their devices 150 have access to their accounts with third party Internet service providers 192 (see FIG. 1D). The device identification system 100 allows the creation of a unique and persistent device identity relationship between users and third party online service providers 192 (relying parties).

Figure 1D:
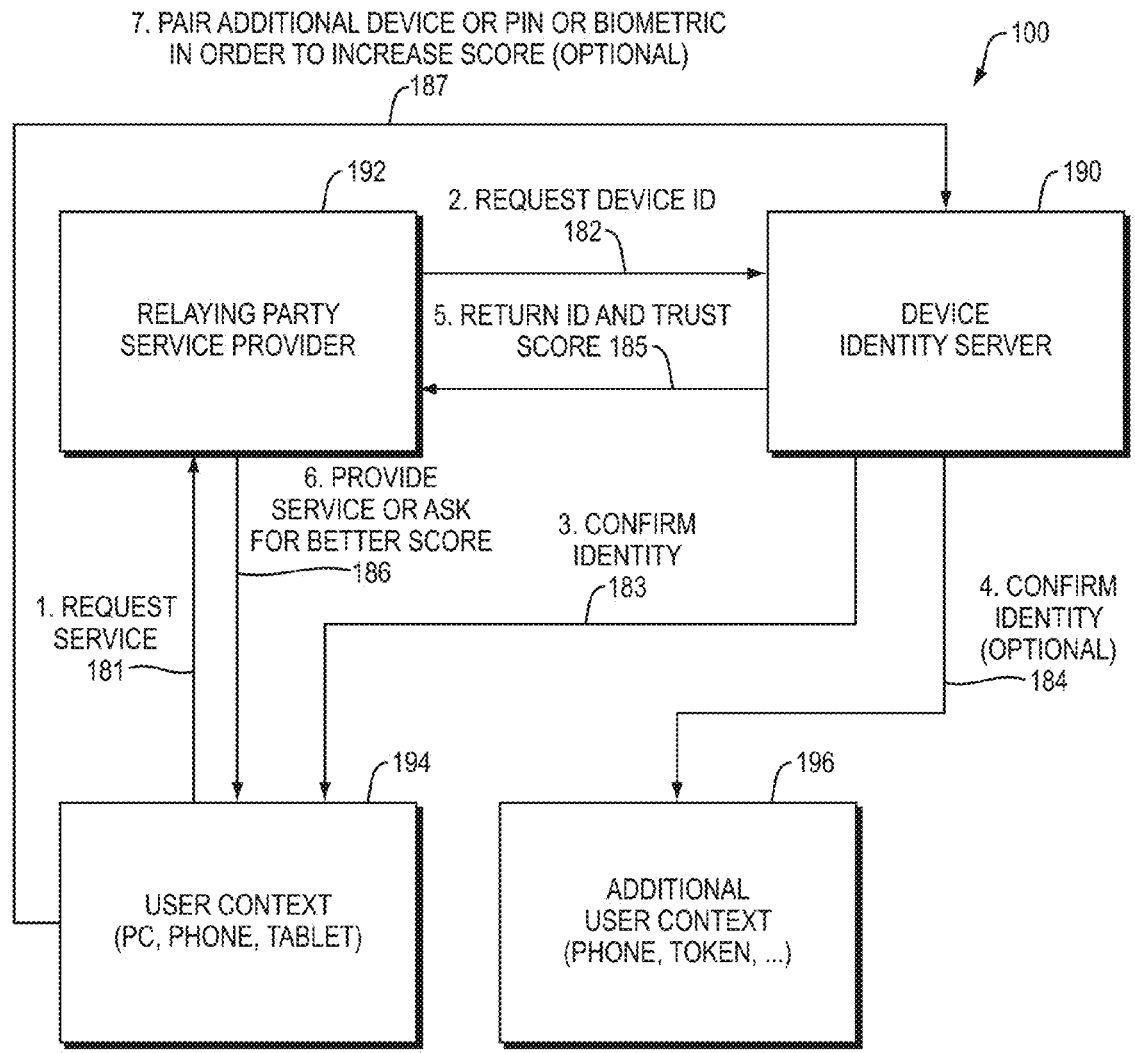
FIG. 1D is block diagram of a device identification process according to an embodiment of the present invention.

FIG. 1D shows an example of the device identification system 100 according to an embodiment of the invention. To enhance privacy, at 181 the user, via its device 150, requests access to a relying third party service provider (e.g. bank, email service, etc.) at which identification tests/factors may need to be satisfied. The relying third party service provider at 182 requests the user device's ID from the device identity server 190, 160. It should be noted that the user's device 150 may be given a unique and confidential ID for each relying party 192. Preferably, this device specific ID will not be known by or disclosed to other relying parties, but will be known by the device identity server 190. A user may register multiple devices 150 with the device identity server 190 to one account. This may be helpful, for example, if the user logs into his/her bank from a home PC 150 at times, but uses a smart phone 150 at other times.

The device identity server 190 confirms the device identity at 194. If additional user context identification is needed pursuant to the device tests/factors and the trust score threshold settings specified by the third party service provider (and/or user), then at 184 the device identity server 190 confirms the identity of the user device using additional context verification tests/factors. Such tests/factors may include determining whether the device is operating a Self-Encrypting Drive (SED), whether the device has been paired with another device or system, whether there is an SMS confirmation, whether there is a matching a biometric fingerprint, whether a correct one-time-password has been entered, etc.

Once the device identity server 190 has confirmed the identity of the device 150, at 185, the device identity server 190 returns the ID and a calculated trust score, which indicates a confidence value regarding the device identification status. If the trust score does not meet a trust score threshold required by, for example, the relying party third party service provider 192, the process initiates another trust score calculation at 186 of which additional device/user context may be needed in order to meet the trust score threshold set by the third party service provider 192 (and/or user). The trust score helps the relying third party service provider 192 determine a measure of confidence about the identity of a device 150. For example if the device is using a Trusted Platform Module (TPM) to create the unique device ID, the score will be higher than if it is using less reliable methods, such as user defined passwords.

Knowing and trusting the device used for web services provides huge benefits to all parties. By relying on a high trust score calculated from an independent device identity server 190, relying third party service providers 192 can identify the device and allow access to their respective services without burdening users with an authentication process. Further, the third party service provider 192 can benefit from reduced fraud from phishing and other account access attacks. Users can benefit from increased confidence that only their devices 150 can access their accounts without relying on username/password combinations to remember. In this way, a user, confident in their control of specific devices, can have easier access to a third party service provider 192. If the third party service provider 192 is confident in the identity of the device 150 it can ease restrictions to access by removing passwords or other barriers. If a third party service provider 192 is confident in the continuity of a certain returning device 150 it can make presumptions based on the additional context verification tests/factors.

Example Device Identification Processes

Figure 2A:
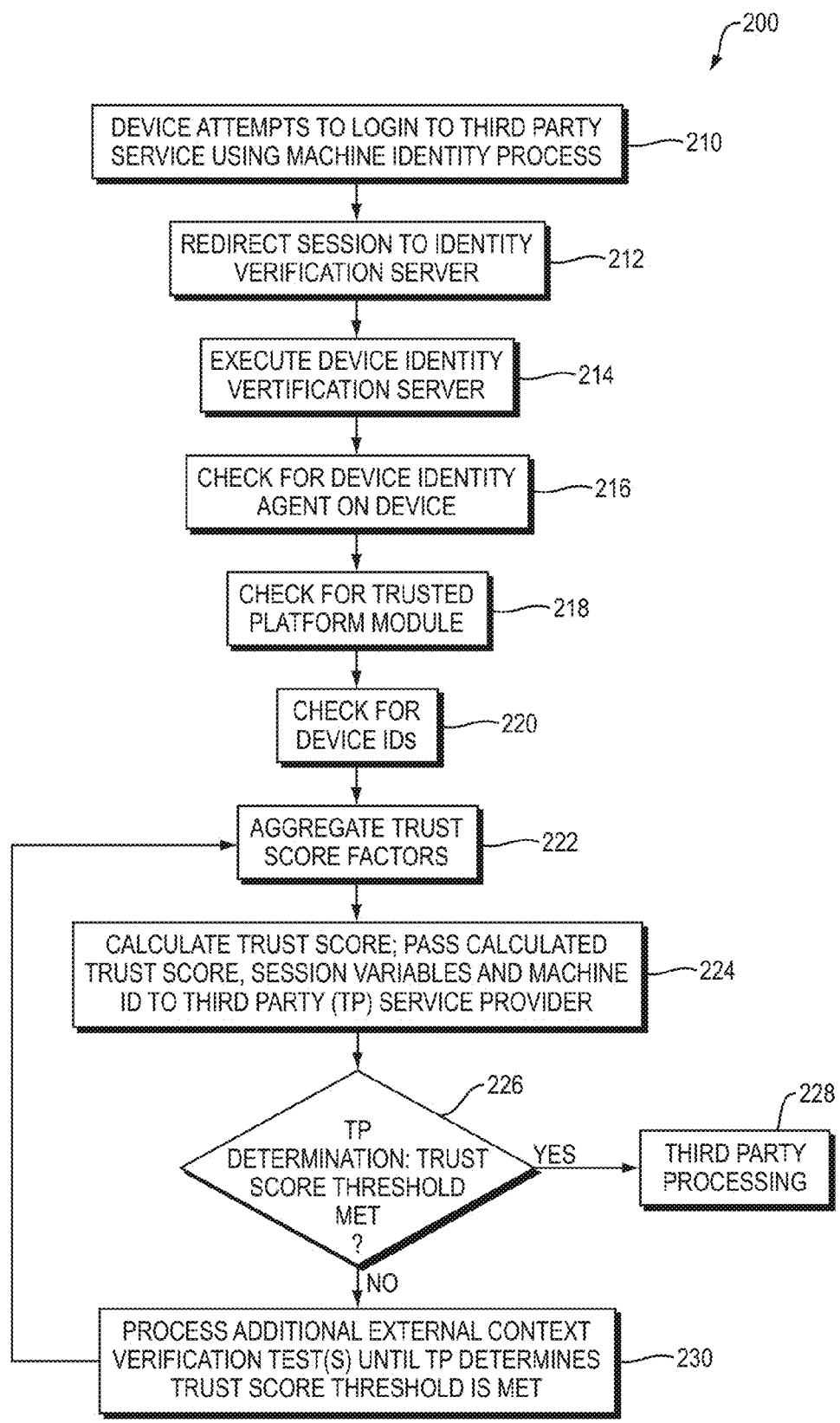
FIG. 2A is a flow diagram of an example device identification process according to an embodiment of the invention.

FIG. 2A is a flow diagram of one example implementation of a device identification process 200 according to an embodiment of the invention. At 210, a device 150 attempts to login to a third party service provider site. At 212, the login process may be redirected to the device identity server 190 to initiate a device identity verification process at 214 in which the identity of the device 150 from which a user may be attempting to login from may be verified.

At 216, the process 200 determines whether there is device identity agent software 115 installed on the device 150. For example, if there is identity agent software locally installed on the device, then server side software at the identity server may connect to the device it is identifying and, then create a session with the identity agent software. The device identity agent may be implemented in any form suitable to perform the device identification process 200. For instance, if the device identity agent may be implemented as a browser plug-in if the browser is Internet Explorer; and if the browser is Safari or Google Chrome, the identity agent may be implemented, for instance, as a mini web server (e.g. a Microsoft Windows service running within the control framework of the Operating System). In mobile implementations, for example, if the device is running an Android or iOS operating system, the identity agent may be implemented as a background service (operating in the background, such that it continues to run even after the agent software is closed by the user). The presence of the identity agent software could help increase the overall calculated trust score if other factors are satisfied. If there is no device identity software, an instance of the device identity software may be executed from the server. When executed from the server, the software may have limited capability to query device attributes.

At 218, the process 200 detects whether there is a trusted platform module on the device. For example, the process 200 may send a message to the identity agent software to determine whether a trusted-platform module is present. If no trusted platform module is detected, the process may search the device 150 for a device/hardware based ID or software key at 220. The presence of a trusted-platform module and a trusted device based ID may substantially increase the calculated trust score.

A multitude of device and software IDs (unique identifiers) may be used to facilitate the device identification process 200. Each type of ID, whether device or software based, may be scored according to type of ID or according to the method used to assign that ID. For instance, during a registration process to register a trusted device (e.g. FIGS. 2B and 5A), the device 150 may be assigned a software ID. For example, this could be done using a cookie, which would result in a low score for this factor, or with a key held in device hardware, such as a trusted platform module chip, resulting in a much higher score. Device identity settings may be configured such that in order to receive a trust score with a high confidence value, the user may need to be operating from a trusted device 150 having a hardware device ID or trusted software ID that the process 200 verifies as being previously being previously registered.

Through this unique identifier information gathering procedure, the process 150 preferably determines a handful of identifiers, which are used at 222 to compute an aggregated weighting score to establish the trust level for device 150. Each one of the additional context verification tests/factors has a respective ranking and weight, which correspond to a measure of trust associated with that test/factor.

The applicable device ID tests that are satisfied, may be aggregated, and the process 200 may divide the aggregated total by the number of available factors at 224. The trust score may be passed to the third party service provider to determine if the trust score threshold is satisfied at 226.

Preferably, the process 200 endeavors to automatically validate an ID through more than one test/factor method, when possible. Multiple factors may be used to calculate the trust score for the device's purported identity. For example, in one preferred secure embodiment, a device identity test may include confirmation of the user's device against two different cell phones. If the device 150 the user is logging in from is assigned a trust score that the third party service provider determines satisfies the threshold at 226, the presumption is that the environment is secure; and at 228, the third party service provider handles the process.

In one example embodiment, the third party service provider may only require that a matching returned device identifier be required to satisfy the trust score threshold for a particular level of service.

If the third party service provider determines at 226 that the calculated trust score does not pass the trust score threshold, then at 230, additional context verification tests/factors may be executed to try to increase the calculated trust score. The process 200 may iteratively execute a series of additional context verification tests/factors until the trust score threshold has been met. For example, the initial trust score calculation at 224 may be based on one or more device IDs (e.g. software or hardware based IDs). If the third party service provider determines that the trust score threshold has not been met, then additional context verification tests may be executed and new trust scores may be computed and passed to the third party service provider until the third party service provider determines that the threshold has been met or until the session with the device has been closed.

It should be noted that a third party service provider (or user) may require that additional identification tests be met in order to satisfy the trust score threshold even if highly ranked primary identification factors (e.g. device ID tests) are satisfied, such as a matching device ID is extracted from a trusted platform module on the device. For example, additional context verification factors may be required, depending on the settings specified, in order to obtain access to particularly sensitive services provided by the relying party (third party service provider). Further, if the primary factors (e.g. first, second, third . . . ranked factors) are not met, or if only one of the primary factors is satisfied, then additional context verification tests may be processed at 230 to try to improve the device's trust score calculation.

Therefore, the third party service provider 192 (and/or user 152) may configure device identification process so that a calculated trust score satisfies a trust score threshold only if both primary multifactor tests are met as well as additional context verification tests are satisfied. Such additional context verification tests may be required to meet the trust score threshold imposed by the third party service provider 192.

The additional trust score context verification tests may require that the user be contacted, that knowledge factors may be imposed, etc. For instance, example additional external additional context verification factors that, if satisfied, may improve the trust score for the device identification session may. Such additional context verification tests/factors may include:

- a trusted ID assigned to each of the user's trusted devices (e.g. if a device being identified has an ID that matches an ID of a trusted device previously specified by the user, the device can be associated with a high confidence of trust, which would increase the resulting confidence value of this factor in the computation of the trust score for an active device identification session);
- trusted physical geographic locations (e.g. a user may specify physical geographic locations from which a trusted device is likely to login, or the device identity server can recall trusted geographic locations, which if satisfied in a device identification session, can increase the confidence value of this factor in the computation of the trust score for a device identification session);
- a phone number to confirm an SMS passcode (e.g. a ping to SMS or IVR, which may include a passcode received in an SMS message, or a call to a smartphone or IVR requesting input of certain keys or information;
- a camera on the device to register facial recognition or audio input to satisfy voice recognition, (e.g. if a face detection or voice detection match is determined, this can result in an increased confidence value of this factor in the computation of the trust score for a device identification session);
- first and/or second passwords (e.g. if password match is determined, this can result in an increased confidence value of this factor in the computation of the trust score for an active device identification session);
- wearable computing, such as Google glass (e.g. if a particular tap on the glasses matches a defined tap, which if satisfied, can result in an increased confidence value of this factor in the computation of the trust score for an active device identification session);
- HID Global Access Control (e.g. a user may pair its trusted devices with other systems, such as a HID access control or alarm system, which if satisfied can result in an increased confidence value of this factor in the computation of the trust score for an active device identification session);
- databases or contexts (e.g. compare the context of the device that is attempting to login against other access systems, for example, if a user associated with the device recently walked into a building using an associated key card, and a device associated with that user is attempting to gain access to the network, then this can result in an increased confidence value of this factor in the computation of the trust score for an active device identification session);
- QR Code—bar code (a two dimensional barcode datamatrix, which may be detected and captured by a camera using decoding software, which if satisfied can result in an increased confidence value of this factor in the computation of the trust score for an active device identification session);
- URL code embedded in an email message (if the URL is embedded in a message and selected, this can result in an increased confidence value of this factor in the computation of the trust score for an active device identification session);
- a hand gesture detected by a camera on the device being identified, which if satisfied can increase the confidence value of this factor in the computation of the trust score for an active device identification session;
- a knowledge-based identification challenge (e.g. picture password challenge is satisfied, this can result in an increase in the confidence value of this factor in the computation of the trust score for an active device identification session); and
- web history (e.g. if predefined URLS or domains, which the user frequently visits, are found in recent website history that are substantially contemporaneous to an active device identification session, this can result in an increase in the confidence value of this factor in the computation of the trust score for the subject active device identification session).

It should be noted that the above listing is not an exhaustive list and, thus, any additional context verification test/factor specified by the user/third party service provider or known to one of ordinary skill in trusted computing may be tested as part of the trust score calculation process.

Further, the resulting trust score may be decreased if certain negative factors are present. For example, if device being identified has been reported lost or stolen, then the trust score may be decreased. Further, if the device is not operating from its usual geographic location, then the trust score may be decreased. The user could negate this by configuring their device identity settings so that the device identity server is aware that he/she will be traveling to a new location.

Another example negative factor that may be used to decrease the trust score is if there have been changes to the BIOS of the device 1500. SCAP scanning processes may be initiated to confirm nothing has been comprised at the device 150.

It should be noted that default values may be assigned to each test/factor for use during the factor aggregation process for the trust score calculation. Further, third party service provider (or the user) may assign values associated with each test/factor. For example, if the device 150 is not paired with other devices, the device 150 can be assigned a lower trust score (e.g. 300). The tests/factors (e.g. device ID and additional context verification test/factors) as well as negative tests/factors may be aggregated to provide a resulting trust score (confidence value).

Initializing Additional Device Identity Context Verification Factors

Figure 2B:
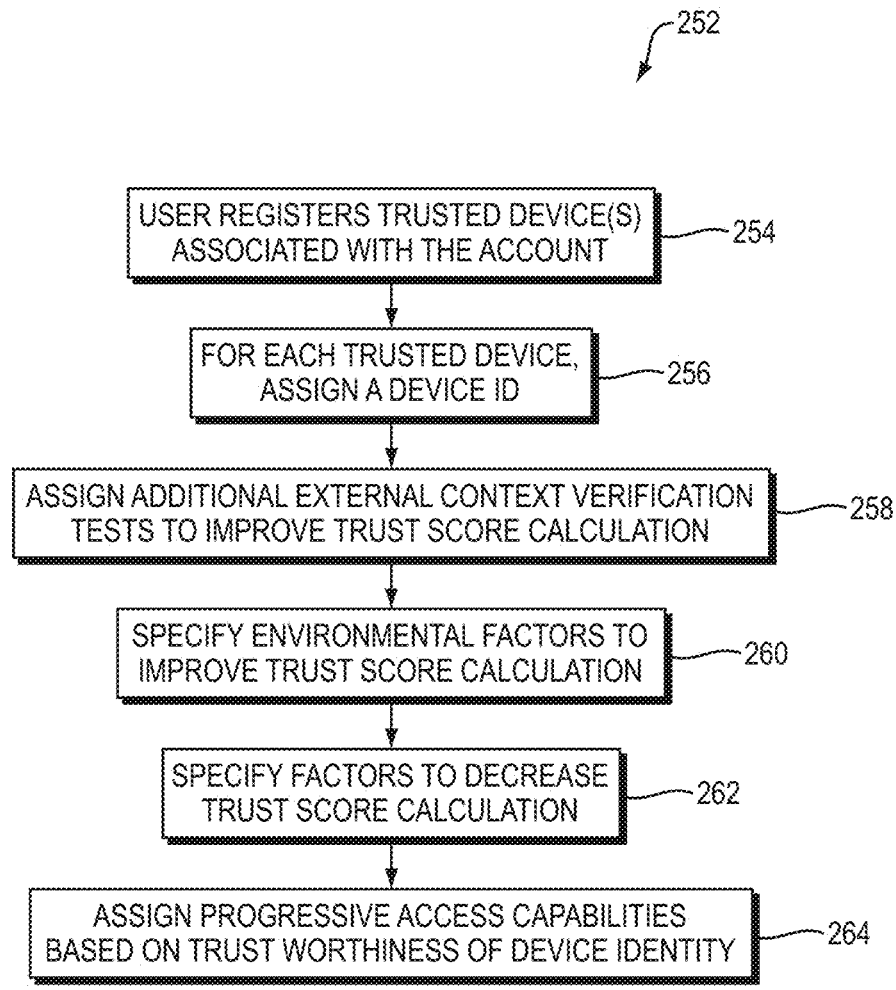
FIG. 2B is a flow diagram of a process in which a user may register methods of device identification according to an embodiment.

FIG. 2B is a flow diagram of an initialization process 252 in which a user may register his/her trusted devices as well as select methods of device identification, including additional context verification tests, according to an embodiment. The device identification server 190, for example, may provide an online interface enabling the user to specify their respective additional context verification settings for a registered trusted device. For instance, a secure browser session may be provided via the device identity server 190 to facilitate a secure connection between a device to be registered 150 from which the user is operating from. A registration process to facilitate registration of a trusted device may be initiated to provide logical interface to facilitate the registration setup so that the user can register his/her trusted devices and specify additional context verification factors with the device identity server 190.

At 254, for example, from a computing device 150, a user may access the device identity server 190 to register trusted device(s). For registration, the user may select the device(s) that the user considers to be trusted from which the user expects to access third party service provider services/systems. Preferably, at 256 the process 252 assigns a device ID to each registered trusted device.

In one embodiment, the process 252 may assign a multitude of identifiers to the device 150. For example, if the device includes a trusted platform module chip, the process 252 assigns an identifier that is anonymous and stores the ID in the trusted platform module chip. The ID is also stored at the device identity server 190. In another example, an ID may be stored in a cookie on the device 150. For the cookie, a random string is generated and stored in the cookie. A further method of establishing a unique identifier is to generate a key PAIR, and test key pair (cryptographic nonce), encrypted with PGP. If the device has a trusted platform module, then the trusted platform module will be directed to generate the key. If there is no hardware root of trust, then the key pair is stored in a key file on the operating system.

When assigning an ID to the device 150 or verifying its identity, the process 252 may also consider other factors to verify the identity of the device for future identification. For example, a Unique Device ID (UDID) or an associated media access control (MAC) address, or other device specific identity information that is substantially static. Generally, the UDID is a 40-character string assigned to certain devices, including Apple devices, such as the iPhone, iPad, and iPod Touch. While Android phones have a UDID, it may not necessarily be static since the UDID can be reset using a factory reset option.

If the device 150 is associated with a communications carrier, e.g. a cell phone service provider, the process 252 may extract the IP address from the device, and send that IP address to the communications carrier. The communications carrier may respond by checking in a lookup table to confirm whether there is an associated SIM card number with that IP address, and then assert back an UDID, that is unique and anonymous ID, which is then recorded by the device identity server 190. The device identity server 190 records the association between the UDID and the device being registered.

The device identity server 190 maintains a mapping table and assigns a different anonymous ID for each third party servicer provider account 192 associated with the device 150. By providing different IDs for different third party service providers, the process 252 can help prevent the third party service providers from colluding and determining, for example, which online accounts/services are associated with a particular device. Any one identifier, cookie, key exchange provides the system 100 with a multitude of attributes in the device's browser forensics (OS, version of browser, screen size), which can be combined by the device identity server 190 to compute up with a unique ID that is a concoction of numbers. Each device 150 may have a plurality of different IDs. One device 150 may have different keys and several different IDs. During the verification process of FIG. 2A, if most of the assigned keys and IDs three are correct (e.g. two out of three), then there is a high probability that the device is the registered device. However, if only one of them are correct, than it may not be the same device.

In another example, if the device 150 is a cell phone, for example, depending on the type of mobile phone, a Telephony-based ID may be determined from the device (or from a SIM card associated with the device). Those skilled in the art would know about the various lookup calls that can be used to obtain such device IDs. For instance, the following example method calls may be used on an Android phone: TM.getDeviceId( ); TelephonyManager.getDeviceId( ); TelephonyManager.getSimSerialNumber( );TM.getDeviceId( )

A MAC address may be used to help identify the mobile device 150. Those skilled in the art will appreciate how to retrieve such information. For example, on an Android phone, the WiFi adapter's MAC address may be queried using:

WifiManager wm=(WifiManager)Ctxt.getSystemService (Context.WIFI_SERVICE); return wm.getConnection Info( ).getMacAddress( );

Such device ID approaches may not be sufficient for a high trust score. Certain embodiments of the invention enable additional tests appropriate to the hardware and environmental context to increase the trust score threshold.

When a user is configuring his/her respective trust score requirements, at 258, the user can choose the collection of additional tests that need to be met. The user can select a combination of tests that can be satisfied without user input, such as without having to touch a keyboard. A user 152 may, for example, specify that his/her trust score should be increased if the device 150 from which they are attempting to access the third party online service provider 192 is successfully paired with another device 150 or with another action.

For example, the user may configure their respective device identity verification settings so that the device identity server 190 needs to verify that the device 150 has been paired with other trusted devices in order to receive a trust score that satisfies the trust score threshold. When the device identity server 190 attempts to identify a device 150 that has added a secondary identity service as an additional context verification factor, it will first collect the device ID as normal, but then call the secondary service/server with that ID before it calculates the trust score. If the second server comes back with a negative response indicating that the ID could not be verified (e.g. a NO response), the trust score may be unchanged and the device identification process may continue. If, however, the secondary service/server replies with a positive response indicating that the ID could be verified (e.g. a YES response), then the trust score is adjusted by a pre-established amount and the process continues.

If the device 150 is paired with a mobile phone, e.g. an SMS sent to the registered phone number, the user will have to reply to the SMS to continue, unless the user has configured his/her identity settings so that additional testing is required to increase the calculated trust score during the device identification process.

Further, the user could configure his/her identity settings so that a picture password in combination a matching software key could result in a high trust score calculation (similar to a high score associated with a certified matching hardware key).

The trust score may be an integer ranging from 0-1000 representing how confident the device identity server 190 is in the reliability and continuity of the device's identity. If a trust score is calculated as a low value that does not meet the trust score threshold, the user can configure their identity settings so that in this situation the system responds by providing other options to improve the trust score through some action, such as downloading software or pairing another device.

In this way, the user 152 can proactively add a multitude of context verification tests/factors to their respective trust score settings, so that he/she can make it easier to manually increase their trust score during a device identification session. For example, the user 152 can configure their respective identity settings so that a device's resulting trust score can be improved during the trust score calculation process. For instance, if the device from which the user is logging-in from is successfully pair with other devices that are preregistered during the initial trust score settings configuration process, this can improve the overall trust score calculation. Example devices that can be pre-registered with the device identity server 190 may include mobile devices, IVR systems, wearable computing devices, HID Global NFC Access Control systems, cameras, etc. Further context verification tests that may be defined include: a second password, databases or additional system checks (checks against other access systems using trusted key cards), receipts of QR Code—bar code (URL code embedded in a message), facial recognition, camera on trusted device that can be used in connection with, for example, matching algorithms to match hand gesture or picture password input that may be drawn in real-time on a device interface or captured by the camera. It should be noted that the above listing is not an exhaustive list and, thus, additional context verification tests/factors specified by the service provider, user or included as a default systems setting for the device identification server, may part of the trust score calculation process (if needed to improve the trust score).

The device identification factors (e.g. device ID and additional context verification factors) may be aggregated to provide a resulting trust score (confidence value). The third party servicer provider (or user) can assign the trust score weights (values) associated with each device identity factor test. For example, if the device 150 is not paired with other devices, the device 150 can be assigned a lower trust score (e.g. 300).

At 260, further additional context verification test/factors may be specified to help improve a future trust score computation process. Such additional context verification tests/factors may include the presence of anti-virus software, a managed self-encrypting drive, or a well-known IP address.

At 262, factors may be specified that can decrease the trust score. For example, the user can configure their respective device identity settings so that the trust score may be decreased if certain negative factors are present, e.g. if the device is not operating from predefined trusted geographical locations, then the trust score should be decreased. The user could negate this by configuring their trust score settings so that the system 100 is aware that he/she will be traveling to a new location.

At 264, the user can configure their identity settings so that tiered or progressive access privileges to a subject third party service provider are permitted based on different trust score calculation ranges or thresholds. For example, the user may specify that a trust score threshold of 900 is required in order to receive full account access. Even at a lower trust score, the user can configure their identity settings for third party online service(s) so that different levels of access/capabilities are provided at different trust score tiers. For example, at a lower trust score, the user can configure his/her identity settings so that the device 150 may successfully login to the third party service provider, but may have fewer capabilities. The user can configure their respective identity settings for a specific third party service provider so the device will have access to fewer capabilities. In this way, a user can configure his/her identity settings so that tiered access is available to different trust score calculations.

It should be noted that while the trust score computation configuration process set forth in FIG. 2B is discussed generally in the context as being performed by a user, some if not all of the processes in FIG. 2B may be performed by a third party service provider. Preferably, the third party service provider specifies a default trust score computation process that relies on any number of tests, but third party service provider may allow the user some agility in the configuration. Further, once the user has registered his/her trusted endpoint devices with the device identity server and specified his/her additional context verification tests/factors, no further configuration may be needed for device identity verification. Unless, for example, a particular requesting party (third party service provider) requires additional requirements to satisfy a higher trust score threshold.

Trust Score Calculation Examples

A trust score can be computed based on a number of factors. Preferably, the trust score is calculated based on a multitude of additional tests/factors associated with the device, such as the device's ID, as well as a range of additional context verification factors, the device's operating context and capabilities, etc.

Figure 4A:
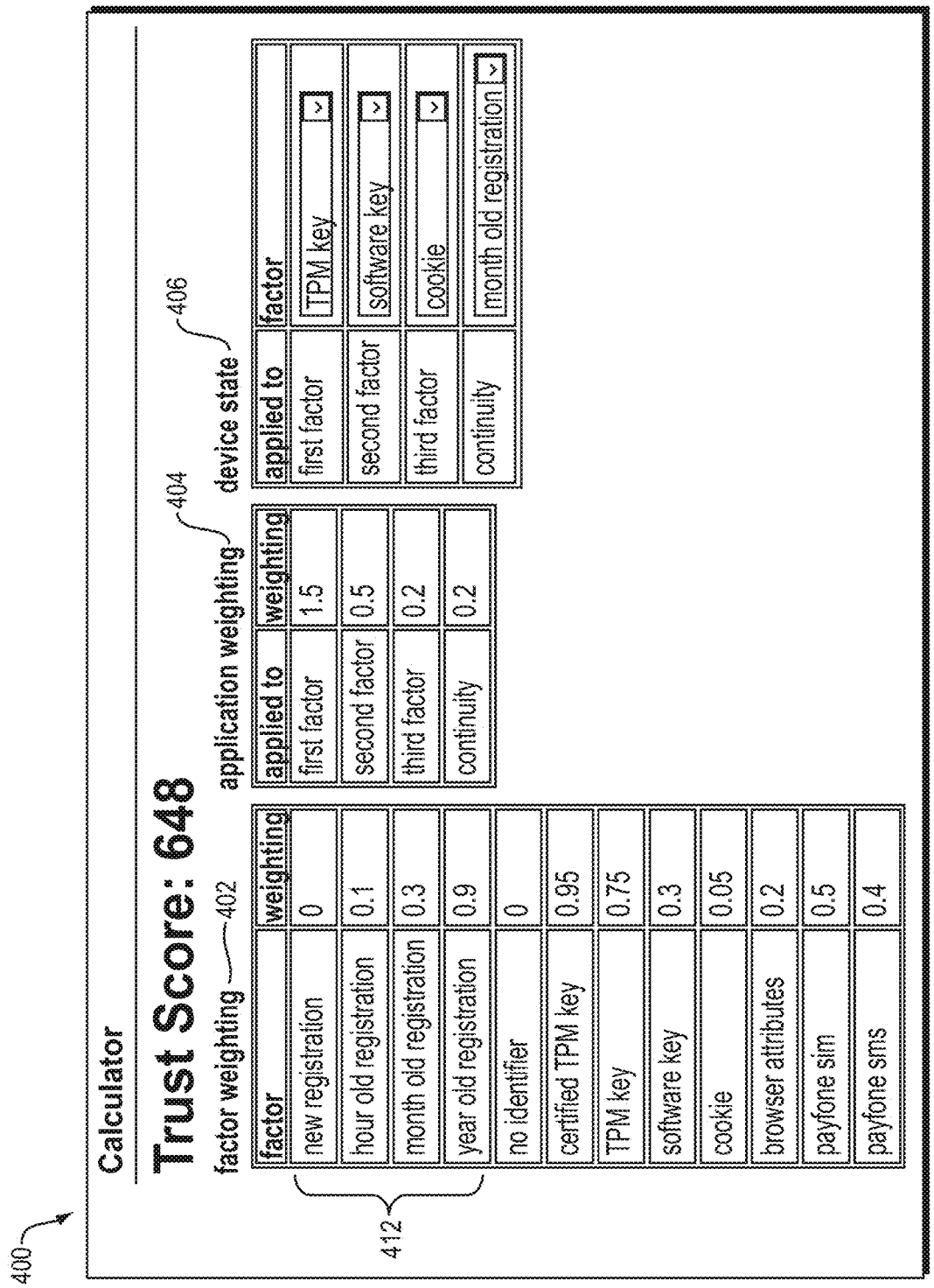
FIG. 4A shows example weighting tables used in the computation of a trust score.

Referring, for example, to FIG. 4A, example weighting tables 400 used in an embodiment of the computation of a trust score are shown. In this example, each of the factors are assigned a weight. The trust scoring engine 310 determines whether a factor 412 is present, and if it is present, it is included in the aggregated total. The trust scoring engine 310 looks to the factor with the highest weighting assigned to it, and designates it as the "first factor", while the factor with the next associated highest weight is designated the "second factor," and the process continues in a similar manner for third, forth . . . factors.

In the example shown in FIG. 4A, the trust score calculation is 648. Unitless weighting factors 412 are provided, which may include, for example, continuity factors, such as whether the device's registration is old/new 412. If, for example, the user successfully used the same registered device identity for more than a year, this suggests that the device identity may be more reliable. Application weightings 404 may be assigned that signify the importance of the respective factors 402 in relation to the overall trust score computation. While the trust score factors involved in the computation shown in FIG. 4A relate generally to the device state 406, additional external contextual tests are preferably considered in the trust score computation. Preferably, for example, tests/factors beyond the environment of the device 150 are considered, such as wearable computing, SMS confirmation, knowledge tests, etc.

Example Third Party Service Provider Integration

The trust score is used by the third party service provider to weigh the reliability of the device requesting access. A third party service provider may integrate the trust score computation processes provided by device identity server 190 into their respective login process. For example, in a website implementation, a third party service provider can integrate the trust score calculation by adding JavaScript code into its HTML page. The html code below provides a non-limiting example implementation that will fetch the device ID record from the user device 150 and pass information to the third party service provider 192 about the device's identity and calculated trust score.

```
<html>
<head>
  <script src="https://id.wave.com/libs/jsi/0.1.0/knowd.min.js"></script>
  <script>
    function getId( ) {
      knowd.identify(function (device) {
        alert("device id is "+device.id+" and trust score is "+device.score);
      });
    }
  </script>
</head>
<body onload="getId">
</body>
</html>
```

One example expected use case is where the third party service provider's web page would save the devices ID with the current user's account and test for a match when the user returns. This could be used to bypass future logins or to satisfy an additional context verification test/factor. Preferably, the device ID is considered as a primary factor.

In this way, the trust score can be used as a threshold to determine when to give the user special privileges (e.g. not typing a password) based on the relative sensitivity value of the data provided at the third party online service provider 192. For example, a site providing customized weather would likely need a very a low trust score threshold. A banking site, on the other hand, may provide read only access even with a high trust score, but additionally require a user PIN for executing transactions.

Example Device Enrolling Session

Figure 5A:
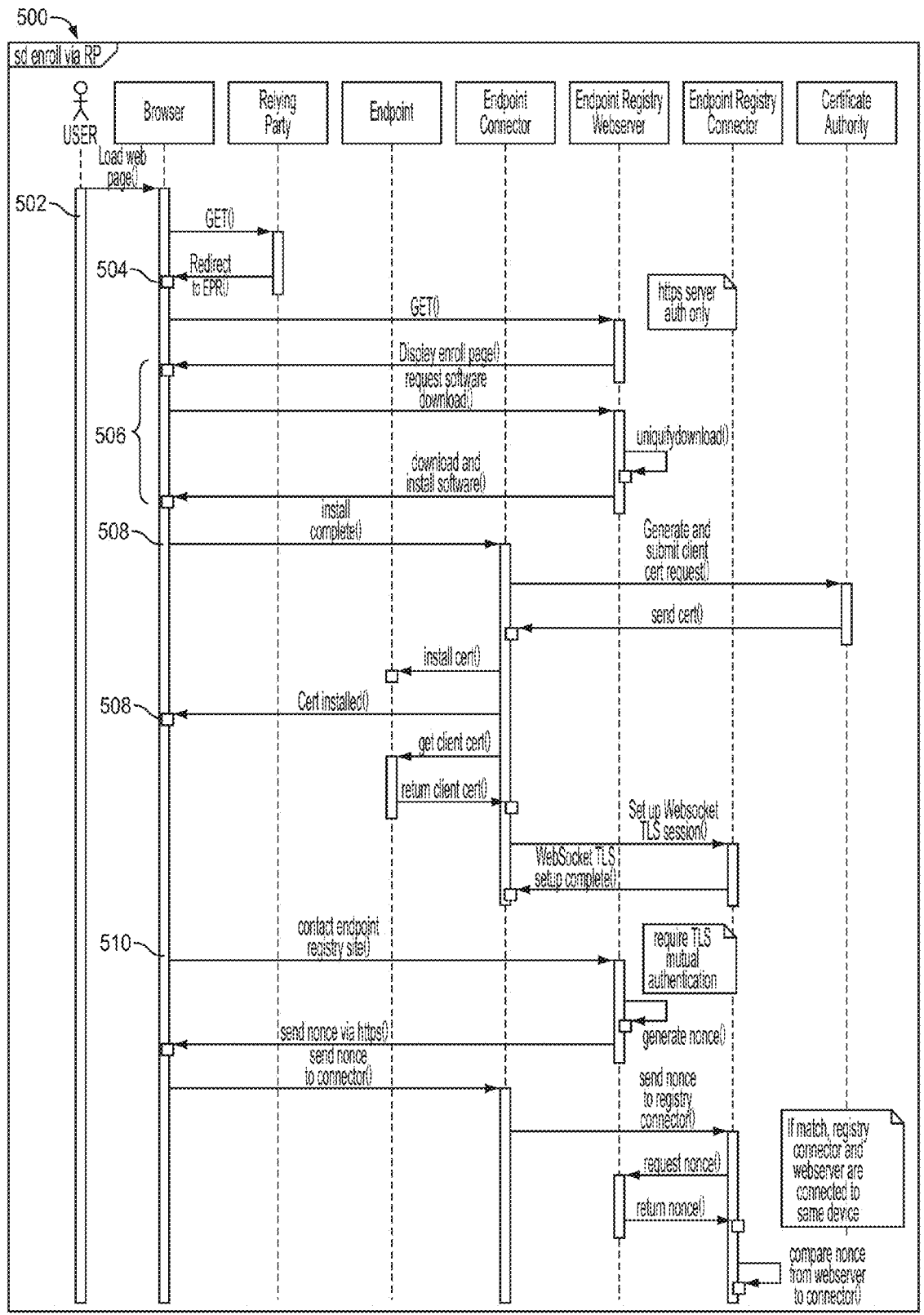
FIG. 5A is a sequence diagram showing an example process for enrolling a new endpoint via a relying party (third party service provider).

FIG. 5A is a use case diagram 500 showing an example registration process for enrolling a new endpoint (user device) via a relying party (third party service provider). At 502, the new endpoint/device 150 loads the webpage from the third party service provider. At 504, the registration process 504, redirects to the registration session with the device identity server. At 506, the user is prompted to download the device identify agent software (end point connector) 115. At 508, once the device identify agent software (end point connector) 115 is installed, and launched, it establishes an SSL session with the device identity server via a WebSocket connection (with server side SSL). At 510, the device identify agent software (end point connector) 115 sends a key to the device identity server (or registration server), and if at 512 the keys match, the registry issues a unique ID to the device identify agent software (end point connector) 115 via the WebSocket connection. The device identity server compares the keys received via the SSL session and WebSocket connection, and if they match, the device identity server issues a unique ID (e.g. cryptographic nonce) for the device.

Display Integration Options

Figure 5B:
FIG. 5B is a screenshot of an example linking/login interface at a third party service provider.

FIG. 5B is a screenshot of an example communication interface 550 at a third party service provider. A login option 552 is included to execute the device identity identification process. For example, third party service provides may integrate the device identification process in a website frame by including method calls in their website code. Making the identification process visible on the website may give the end-user information that can provide the user with additional confidence in the service provider.

In a non-limiting example, a method call such as knowd.setParentElement( ) may be used to have the identification process display in a frame. The example method takes two arguments:

--- element -- pointer to a DOM object that will be the parent of the display frame. For example, document.getElementById("knowdContainer").
display Type -- one of the following type selections:
knowd.NONE -- no display. By not invoking setParentElement, display is hidden by default. So this option is unnecessary.
knowd.SMALLVIEW -- display the identification frame in a 50x50 pixel view port (this is the default if the argument is null)
knowd.LARGEVIEW -- display the identification frame in a 120x120 pixel view port
knowd.TAG -- display the identification frame in a 20x20 pixel view port
For example, Function getId( ) {
knowd.setParentElement(document.getElementById("knowdContainer"), knowd.LARGEVIEW);
knowd.identify(function (device) {
// got device.id
});
}

---

Trust Scoring Analytics

Information related to additional context verification test/factors used in the calculation of a trust score, including information regarding which tests/factors are successfully applied versus those that were processed but were not successfully applied can be used to improve the quality of the trust scoring engine. For example, an analytics tool (such as a web analytics tool or BI tool) may produce various metrics such as measures of additional context verification factor/test success based on the combination of other criteria (e.g. environment variables associated with the device being identified), and filter these results by time of the day or time period or location. Such measures can be viewed per test/factor to help improve the trust scoring engine/agent/tool because the results may be aggregated across a multitude of devices, users, and third party service providers.

An analytics tool offers the possibility of associating other quantitative data beside frequency data with a successful test/factor application. For instance, the results of a high trust score calculation could be joined against the metrics derived by an analytics system (such as a web analytics solution or a business intelligence solution).

Furthermore, analytics data for a calculated trust score for a device can be aggregated per type of device. For example, it could be of interest to know which types of tests/factors are most or least conducive to a high trust score calculation, or on the contrary, applied to a low trust score calculation.

While this invention has been particularly shown and described with references to example embodiments thereof, it will be understood by those skilled in the art that various changes in form and details may be made therein without departing from the scope of the invention encompassed by the appended claims. For example, while pseudo code may be provided herein, it is included for illustrative purposes only and is not intended to limit inventive scope. Further, while specific example additional context verification tests/factors are described herein, those of ordinary skill in the field of trusted computing will appreciate that such additional context verification tests/factors are exemplary and similar context verification tests/factors are applicable and encompassed by the appended claims.

What is claimed is:

1. A data processing system configured to facilitate identification of a first device seeking to communicate with at least one third party service provider, the data processing system comprising:
   a session handler configured to communicate with the first device to determine a multitude of unique identifiers associated with the first device, the session handler configured to request additional context verification from one or more of: the first device, an operator of the first device, or one or more other devices;
   a trust scoring engine, in communication with the session handler, configured to compute a trust score based on (i) the trustworthiness of the first device unique identifiers, and (ii) results from the additional context verification;
   a communication interface in which the third party service provider receives the first device unique identifiers and the computed trust score of the first device;
   wherein each unique identifier has a respective value indicative of a representative level of trust associated with that unique identifier, the respective value being configured for use as part of the trust score computation by the trust scoring engine; and
   if the computing of the first device's trust score satisfies a threshold, then the first device is granted access to certain restricted services of the third party service provider.

2. A data processing system as in claim 1 wherein if the third party service provider responds to receipt of the device unique identifiers and computed trust score with a message indicating that the calculated trust score did not satisfy a trust score threshold, the trust scoring engine being configured to respond by executing a process that attempts to provide an increased trust score computation.

3. A data processing system as in claim 2 wherein the process that attempts to provide an increased trust score computation includes iteratively processing further additional context verification tests.

4. A data processing system as in claim 1 wherein the unique identifiers are hardware based or software based; and
the trust scoring engine being configured to assign a greater respective value to a hardware based identifier relative to a respective value assigned to a software based identifier.

5. A data processing system as in claim 4 wherein if one of the unique identifiers is a cryptographic key based identifier, the trust scoring engine being configured to assign a greater respective value to the cryptographic key based identifier.

6. A data processing system as in claim 1 wherein if one of the unique identifiers is a browser cookie identifier, the trust scoring engine being configured to assign a lower respective value to the browser cookie identifier.

7. A data processing system as in claim 1 wherein the additional context verification from the first device further includes one or more of the following environmental variables about the device: presence of anti-virus software, whether the first device is a managed self-encrypting drive, whether the first device is operating from a well-known IP address, or an amount of time that the first device has been registered.

8. A data processing system as in claim 7 wherein the amount of time that the first device has been registered is based on the amount of time that the first device has been registered with a device identity server.

9. A data processing system as in claim 7 wherein the amount of time that the first device has been registered is based on the amount of time that at least one of the unique identifiers used in the trust score calculation has been assigned to the first device.

10. A data processing system as in claim 7 further includes:
a device identity server, in communication with the first device, configured to execute at least portions of the trust scoring engine; and
the first device identity server configured to communicate with the third party service provider via the communication interface.

11. A data processing system as in claim 1 wherein the additional context verification from the first device further includes satisfaction of a geographic test; and
the trust scoring engine configured to assign a greater confidence value in response to satisfying the geographical test when a determined geographical location from which the first device is operating matches a trusted geographic location associated with the first device.

12. A data processing system as in claim 1 wherein the additional context verification from an operator of the device further includes satisfaction of biometrics test configured to determine whether matching biometrics information is received.

13. A data processing system as in claim 1 wherein the additional context verification from an operator of the device further includes satisfaction of a facial recognition test configured to determine whether an input facial image matches a trusted facial image.

14. A data processing system as in claim 1 wherein the additional context verification from an operator of the device further includes satisfaction of a voice recognition test configured to determine whether an input voice sample satisfies a trusted voice sample.

15. A data processing system as in claim 1 wherein the additional context verification from an operator of the device further includes determining whether an object in an input image matches a trusted object.

16. A data processing system as in claim 1 wherein the additional context verification from an operator of the device further includes successful confirmation of receipt of a URL code embedded in a message.

17. A data processing system as in claim 1 wherein the additional context verification from an operator of the device further includes successful confirmation of receipt of a one-time password.

18. A data processing system as in claim 1 wherein the additional context verification from an operator of the device further includes successful confirmation of a knowledge-based identification challenge.

19. A data processing system as in claim 1 wherein the additional context verification from one or more other devices further includes one or more of: a successful pairing with a trusted device; successful SMS confirmation via a trusted device; successful IVR confirmation via a trusted device; successful HID Global NFC Access Control verification; or successful verification via trusted wearable computing.

20. A data processing system as in claim 1 wherein the trust scoring engine is configured to decrease the first device's computed trust score if there have been changes to the BIOS of the first device.

21. A data processing system as in claim 1 wherein the trust scoring engine is configured to decrease the first device's computed trust score if the first device is not operating from a known trusted location.

22. A data processing system as in claim 1 wherein the trust scoring engine is configured to decrease the first device's computed trust score if the first device has been reported lost or stolen.

23. A data processing system as in claim 1 wherein the computing of the first device's trust score satisfies a threshold when the first device's trust score computation is compared against a threshold trust score to determine whether the first device should be granted access to certain restricted services provided by the third party service provider, and if the first device's trust score meets or exceeds the threshold, then the first device is granted access to the certain restricted services.

24. A data processing system as in claim 23 wherein trust score threshold is met without requiring any input from an operator of the first device.

25. A data processing system as in claim 1 wherein the trust scoring engine is a device identity agent operating on the first device.

26. A data processing system as in claim 1 wherein the third party service provider responds to the receipt of the first unique identifier and the computed trust score of the first device by requesting additional information about the first device to make additional risk assessments about the first device's purported identity.

27. A data processing system as in claim 26 wherein the additional information requested about the first device includes information regarding the trustworthiness of the first unique identifier including (i) a length of time the first unique identifier has been associated with the first device; and (ii) whether the first unique identifier is software or hardware based.

28. A data processing system as in claim 26 wherein the additional information requested about the first device includes a length of time the first device has been known by a device identity server.

29. A computer implemented method of facilitating identification of a first device seeking to communicate with at least one third party service provider, the method comprising:
receiving a third party service provider request for a unique identifier and trust score computation for the first device;
responding to the third party service provider request by:
communicating with the first device to determine a multitude of unique identifiers associated with the first device;
requesting additional context verification from one or more of: the first device, an operator of the first device, or one or more other devices;
computing a trust score based on (i) the trustworthiness of the first device unique identifier, and (ii) results from the additional context verification; and
sending the first device unique identifier and computed trust score to the third party service provider; and
wherein each unique identifier has a respective value indicative of a representative level of trust associated with that unique identifier, the respective value being configured for use as part of the trust score computation;
if the computed trust score satisfies a threshold, then the first device is granted access to certain restricted services of the third party service provider.

30. A computer implemented method as in claim 29 wherein if the third party service provider responds to receipt of the first device unique identifier and computed trust score with a message indicating that the calculated trust score did not satisfy a trust score threshold, responding by executing a process that attempts to provide an increased trust score computation.

31. A computer program product stored on a non-transitory computer readable medium configured to facilitate identification of a first device seeking to communicate with at least one third party service providers, the computer program product having computer readable code that is configured to respond to a request from a third party service provider for a unique identifier and a trust score computation associated with the first device by:
communicating with the first device to determine a multitude of unique identifiers associated with the first device;
requesting additional context verification from one or more of: the first device, an operator of the first device, or one or more other devices;
computing a trust score based on (i) the trustworthiness of the first device unique identifier, and (ii) results from the additional context verification;
sending the first device unique identifiers and computed trust score to the third party service provider;
wherein each unique identifier has a respective value indicative of a representative level of trust associated with that unique identifier, the respective value being configured for use as part of the trust score computation; and
if the computing of the first device's trust score substantially satisfies a threshold, then the first device is granted access to certain restricted services of the third party service provider.

32. A data processing system configured to facilitate configuration of a device identity verification process, the data processing system comprising:
a device identity server configured to facilitate computation of a trust score for a first device in response to a request from a third party service provider, the device identity service configured to execute, on one or more computer processors, a device identity verification process responsive to the third party service provider request, where the device identity verification process is configured to:
determine a multitude of unique identifiers associated with the first device, the plurality of unique identifiers being configured for use in the computation process of the trust score for the first device;
send the computed trust score to the third party service provider at which a determination is made as to whether the first trust score computation satisfies a trust score threshold; and
respond to an indication from the third party service provider that the trust score threshold has not been satisfied by executing a multitude of additional verification tests and, iteratively computing respective iterations of a further trust score for the first device based on the satisfaction of the additional verification tests, where each further computed trust score is passed to the third party service provider for determination as to whether the further computed trust score satisfies the trust score threshold;
the additional verification tests being based on data obtained from the first device, an operator of the first device, or one or more other devices;
wherein each unique identifier has a respective value indicative of a representative level of trust associated with that unique identifier, the respective value being configured for use as part of the trust score computation; and
if the computation of the first device's trust score satisfies a threshold, then the third party service provider grants access to certain restricted services of the third party service provider.

* * * * *